United States Patent [19]
Baldwin et al.

[11] Patent Number: 5,505,438
[45] Date of Patent: Apr. 9, 1996

[54] WORK PIECE LOCATING APPARATUS

[75] Inventors: John B. Baldwin, Warrenville; Dave R. Draper, Montgomery; Ronald R. Schultz, Sandwich, all of Ill.

[73] Assignee: Caterpillar Inc., Peoria, Ill.

[21] Appl. No.: 347,543

[22] Filed: Nov. 30, 1994

[51] Int. Cl.⁶ ........................................ B25B 1/08
[52] U.S. Cl. .................... 269/100; 269/305; 269/296; 269/315; 269/900
[58] Field of Search .................. 269/91–94, 100, 269/99, 305, 296, 315, 900, 910; 29/263

[56] References Cited

U.S. PATENT DOCUMENTS

| | | |
|---|---|---|
| 2,430,613 | 11/1947 | Hodge . |
| 2,888,052 | 5/1959 | Reason . |
| 3,948,502 | 4/1976 | Waller et al. . |
| 4,461,946 | 7/1984 | Kratschmer . |
| 4,508,327 | 4/1985 | Ersoy . |
| 4,641,819 | 2/1987 | Poland . |
| 4,875,666 | 10/1989 | Main ........................................ 269/900 |
| 5,026,033 | 6/1991 | Roxy . |
| 5,129,637 | 7/1992 | Ito et al. . |

FOREIGN PATENT DOCUMENTS 3624148  1/1988  Germany ................................. 269/94

OTHER PUBLICATIONS

Caterpillar Application (Docket 93–272) Filed Simultaneously With This Application Titled "Apparatus for Loc. a Work Piece on a Burn Table".

*Primary Examiner*—Robert C. Watson
*Attorney, Agent, or Firm*—Kenneth A. Rhoads

[57] ABSTRACT

An apparatus is provided for locating a work piece on a burn table. The apparatus has a locator which is moveable between a first position at which the locator is engageable with the work piece and a second position at which the locator assembly is spaced from the work piece.

4 Claims, 3 Drawing Sheets

Fig_1_

WORK PIECE LOCATING APPARATUS

TECHNICAL FIELD

The present invention relates to a work piece locating apparatus for a burn table.

BACKGROUND ART

Flame cutting is utilized for cutting, piercing, scarfing, severing, and the like of selected portions of metal from steel work pieces. Conventional production flame cutting machines have one or more automatic or semiautomatic computer controlled and guided torches for preforming the operation generally on a water submerged horizontal burn table. Often these are repetitive operations, cutting the same preselected shape over and over again. The work piece generally rests on a plurality of upstanding pedestals at water level. The work piece is positioned on the burn table by butting one or more edges of the work piece against a series of removable locators on the burn table. The locators are manually installed in holes in the burn table at predetermined locations relative to a preselected programmed path of the torch or torches. After the work piece has been positioned the locators must be removed from the burn table to prevent damage to the locators from the torch during the burn operation. Time spent by the operator installing and removing the locators detracts from productive work. In addition it is possible to inadvertently install a locator at a wrong location resulting in the work piece being positioned incorrectly on the burn table. Still further, the constant installation and removal of the locators from the burn table results in accelerated wear of the locators and burn table mating surfaces. The subject invention provides a relatively simple locating apparatus which need not be removed from the burn table, but pivoted out of the way during the burn operation and pivoted back to locate the next work piece. With such construction there is realized a savings of equipment, labor, and natural resources.

The present invention is directed to overcome one or more of the problems as set forth above.

DISCLOSURE OF THE INVENTION

In one aspect of the invention a work piece locating apparatus precisely positioning a work piece relative to a work table. The work piece has a plurality of edges and the work table has a plurality of holes. The locating apparatus includes a base having first and second surfaces, an opening, and a counterbore extending about the opening on the second surface. A support member of general "U" configuration is spaced preselected distances from the opening and extends outwardly from and generally transverse the first base surface.

A split sleeve has a converging internal surface and is adapted to be insertable within a selected one of said holes of the work table.

A tubular shaft has first and second end portions and a flange adjacent the first end portion. A holding member has a converging outer surface mateable with the converging internal surface of the split sleeve. A clamping system has a cam associated with a connecting member and pivotally connected to the tubular shaft for moving the holding member into and from forcible contact with the split sleeve.

A locator has a first end portion pivotally connected to the base member for movement between a first preselected position at which the stop is contactable with a work piece and a second position spaced from said first position.

In another aspect of the invention a work piece locating apparatus precisely positioning a work piece relative to a work table. The work piece has a plurality of edges and the work table having a plurality of openings.

A first base has first and second surfaces, an opening, a counterbore extending about the opening on the second surface. A supporting member of general "U" configuration is spaced preselected distances from the opening and extending outwardly from and generally transverse the first base surface.

A split sleeve has internal and external surfaces and first and second end portion. The internal surface of the first and second end portion are tapered inwardly and the split sleeve is insertable into one of the table openings.

A second base member has first and second end portions and an opening extending therethrough. The second end portion has a tapered surface converging in a direction from the second surface with the first holding member converging surface being mateable with the second internal surface of the split sleeve. The is insertable into the first base member counterbore.

A holding member has a threaded opening and a converging outer surface mateable with the first converging surface of the split sleeve.

A connecting member has a first threaded end portion, a second end portion pivotally connected to the first base member and a middle portion. The first end portion is threadably connected to the holding member, and the middle portion is slidable extending through the second base member opening.

A locking cam is pivotally connected to the first base member and the connecting member is adapted for moving the holding member into and from forcible engagement with the internal first end portion of the split sleeve and moving the split sleeve into forcible contact with the associated table opening.

A locator has first and second end portions. The locator second end portion has a cam and first end portion is pivotally connected to the first base portion. The locator is pivotally moveable between a first position at which the cam is at a preselected location and contactable with an edge of a work piece and a second inoperable position at which the cam of the positioning stop is spaced from said first position.

BEST MODE FOR CARRYING OUT THE INVENTION

Figure 1:
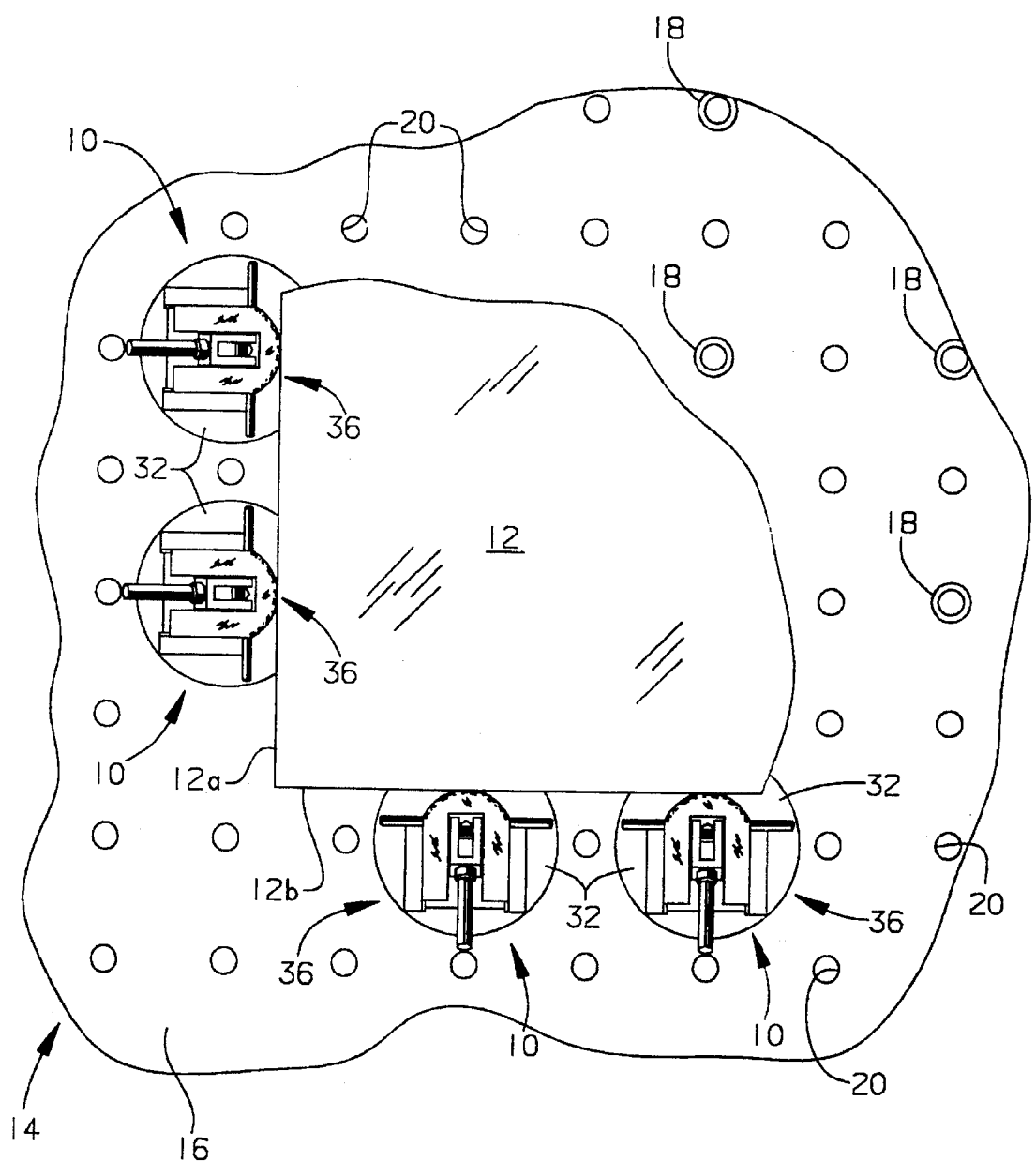
FIG. 1 is a diagrammatic top view of a burn table incorporating the subject invention.
Figure 2:
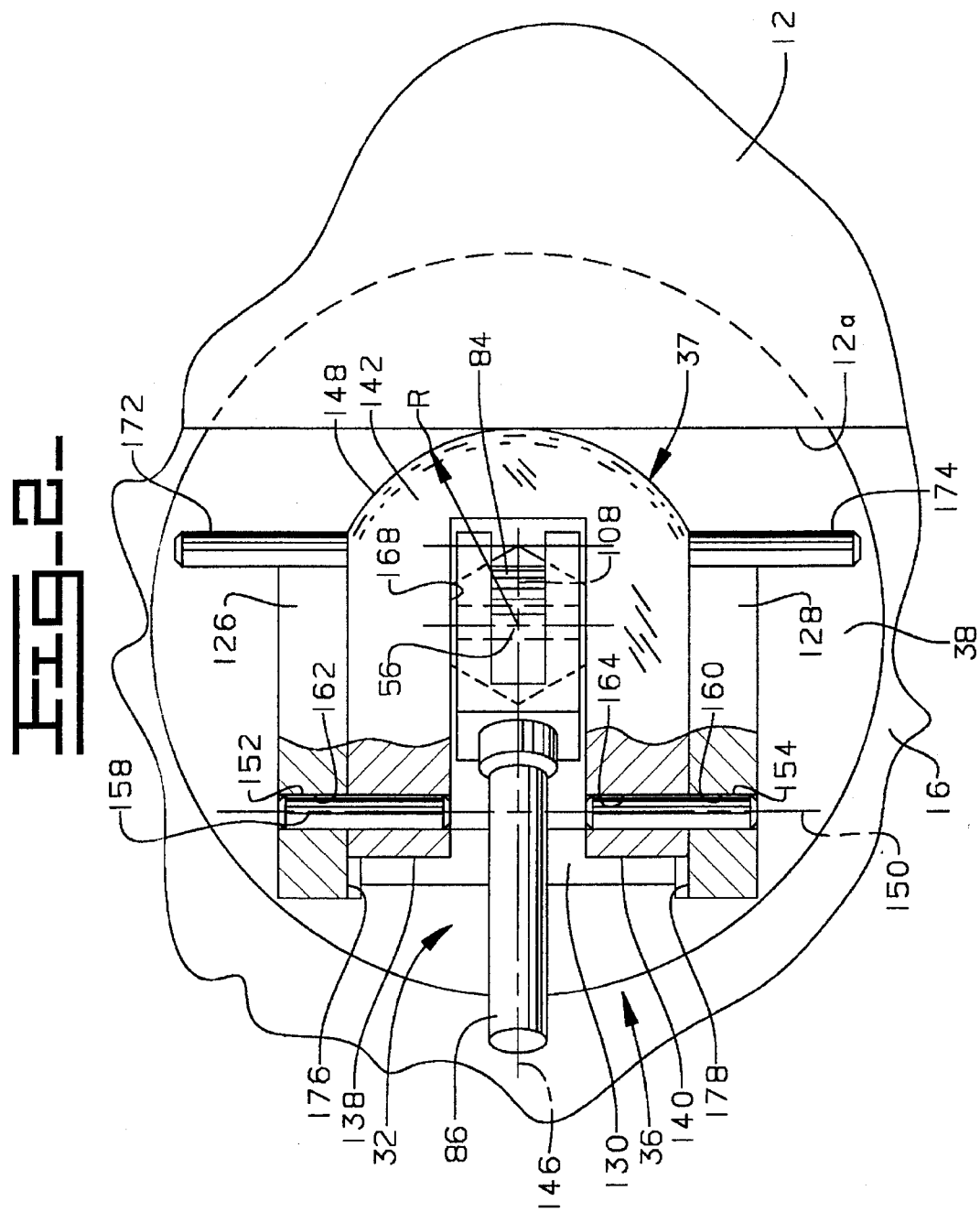
FIG. 2 is a diagrammatic enlarged top view of the locating apparatus.
Figure 3:
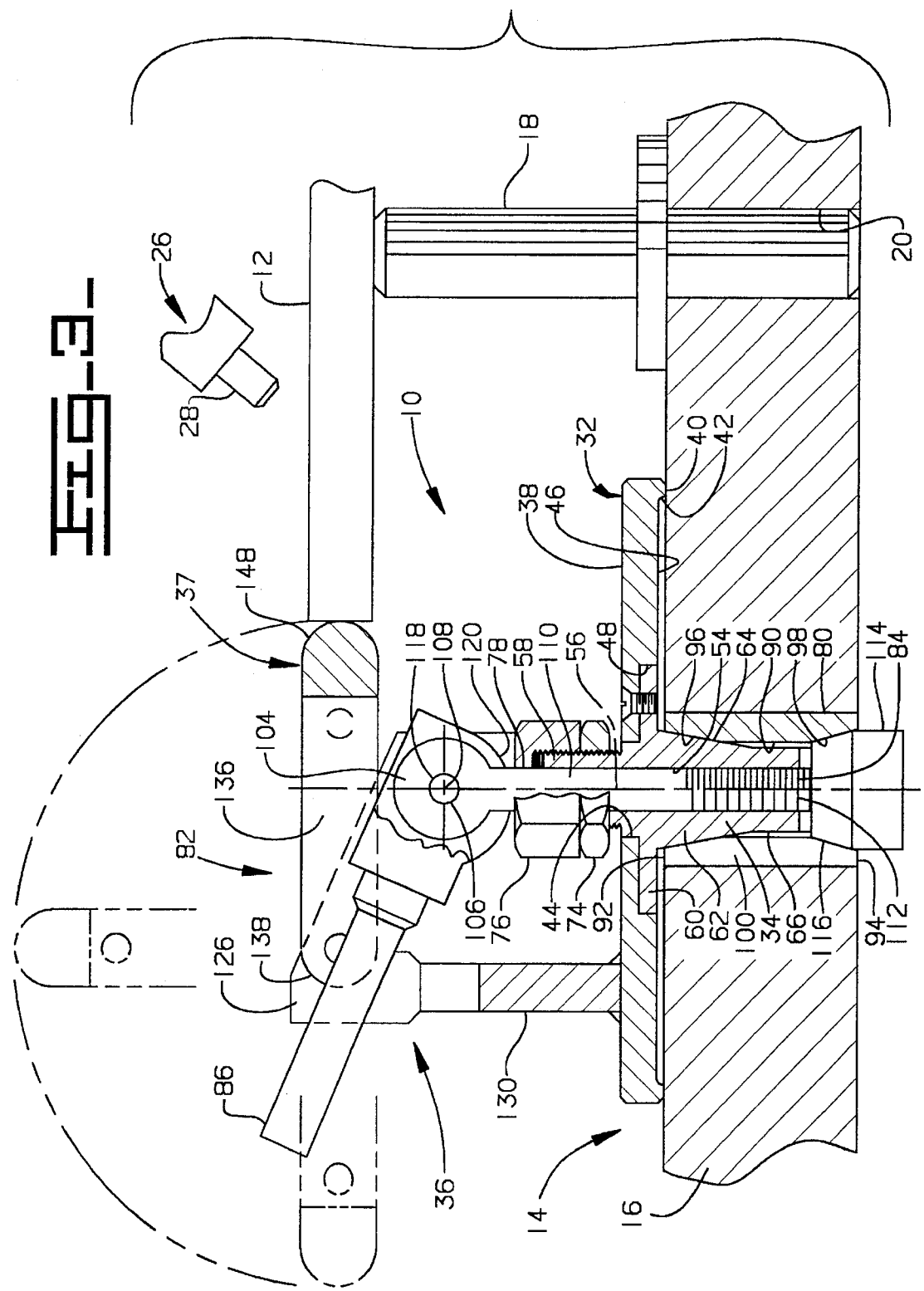
FIG. 3 is a diagrammatic cross-sectional view of the locating apparatus mounted on the burn table.

Referring to FIGS. 1, 2, and 3 a plurality of locating apparatus 10 for locating a work piece 12 having a plurality of edges 12a, 12b on a submerged cutting work table or burn table 14 is illustrated. In the description of the drawings, only one locating apparatus 10 will be described in detail with the remainder being identical. It is understood that normally, at least a pair of the locating apparatus 10 are used to locate a work piece 12 on the burn table 14.

The burn table 14, as is well known in the art, is formed from a horizontal table or platform 16 and includes a plurality of vertical work piece pedestals 18. The platform 16 of the burn table 14 defines a plurality of holes 20 positioned at preselected locations, each adapted to selectively receive one of the locating apparatus 10 or one of the pedestal 18. The pedestals 18 support the work piece horizontally. The platform 16 and pedestals 18 are normally submerged in water.

As shown in FIG. 3, a conventional computer controlled flame cutting machine 26, as is well known in the art, is mounted for movement over the top of the burn table 14 and the work piece 12. The flame cutting machine 26 includes a downwardly directed cutting torch 28. In operation, flame from the torch 28 performs a cutting operation on the work piece 12. The pedestals 18 provide space between the back side of the work piece 12 and the platform 16 since the flame from the cutting torch 28 must generally pass entirely through the work piece without being deflected.

Preferably, the locating apparatus 10 includes a generally cylindrical horizontal first base 32 and a second base or vertically mounted tubular shaft 34. The first base 32 includes a support member 36 of generally "U" configuration and a hinged locator 37.

As best shown in FIG. 3, the base 32 has a first surface 38, a second surface 40 having a recess 42, and a central opening 44. The recess 42 has a rear wall 46 and a counterbore 48 is defined in the second surface 40. The counterbore 48 extends about the central opening 44 on the second surface 40.

The tubular shaft 34 defines a bore 54 having a central axis 56. The tubular shaft 34 further has a first upper threaded end portion 58, a cylindrical flange 60 adjacent the threaded end portion, a middle shaft portion 62 having a generally conical downwardly converging surface 64, and a second lower cylindrical end portion 66. The threaded end portion 58 of the tubular shaft is piloted in the central opening 44 of the base 32 with the flange 60 piloted in the counterbore 48. A lock nut 74 and a flat top cap nut 76 having a cap nut bore 78 are threads on the first upper end portion 58 of the tubular shaft 34.

An expandable split clamping sleeve 80 for selectively clamping the shaft 34 within one the hole 20 is provided about the middle and second end portions 62 and 66 of the tubular shaft 34. The split sleeve 80 fits snugly in the hole 20 of the platform 16 and a clamping system 82 is operable for expanding the split sleeve 80 laterally so as to secure the apparatus 10 in the hole in accordance to axial movement of a connecting member 84 of the clamping system 82.

The split sleeve 80 defines a sleeve bore 90 and has first and second sleeve end surfaces 92 and 94. A pair of first and second internal converging sleeve surfaces 96 and 98 extend axially inward from the first and second end surfaces 92 and 94 terminating at the sleeve bore 90. The split sleeve 80 is formed with one slit 100 extending axially the full length of the sleeve. Alternatively, it is recognized that the sleeve 80 could be formed with multiple slits alternately extend upward and downward from the end surfaces 92 and 94 so as to separate the sleeve 80 into multiple equivalent segments alternately joined to each other at their ends.

The connecting member 84 has a first upper head end portion 104 of ring configuration defining an aperture 106 having an axis 108, an intermediate cylindrical shank portion 110 and a second lower threaded end portion 112. The connecting member 84 extends downward, as viewed in FIG. 3, through the cap nut bore 78 and the shaft 54 where it is threadably connected to a holding member 114. The holding member 114 has a generally upwardly converging conical surface 116. The first converging sleeve surface 96 engages with the converging surface 64 of the tubular shaft 34 and the second converging sleeve surface 98 engages with the converging surface 116 of the holding member 114.

The connecting member 84 is pivotally connected to the cam lever 86 by a pin 118 that extends through the aperture 106 of the connecting member. The cam lever 86 has an outer peripheral cam surface 120 defined by a preselected curve generated about the axis 108, The cam surface 120 rides on the cap nut 76 for moving the holding member 114 into forcible contact with the split sleeve 80.

As best shown in FIG. 2 and 3, the generally "U" shaped support 36 includes a pair of spaced apart, generally parallel vertical plates 126, 128 weldably connected to the first side 38 of the base 32. A generally vertical cross member 130 extends between the vertical plates 126, 128 and is weldably connected to each of the plates and the base 32. The support member 36 is spaced a preselected distance from the opening 44 and extends outwardly from an generally transverse the first base surface 38.

The hinged locator 37 has a first end portion 138 having a first end surface 140, a second end portion 142, a longitudinal axis 146 and a preselected length. The second end portion 142 has a second outer cam peripheral end surface 148 defined by a preselected radius "R" generated from them the axis 56. The first end portion 138 of the locator 136 is pivotally connected about a transverse axis 150 to the base 32 by a pair of axially aligned generally horizontal hinge pins 152, 154. The pins 152 and 154 are located in a pair of apertures 158 and 160 defined in the vertical plates 126, 128 and a pair of apertures 162 and 164 defined in the locator 136. A slot 168 is defined in the first end portion 138 and extends inward from the first end surface 140 and straddles the cam lever 86. A pair of generally horizontal handles 172, 174 extend outwardly from the second end of the locator 136 to aid in pivoting the locator.

The peripheral surface 148 is adapted to make contact with the work piece 12 and the hinged locator 136 is adapted to be pivotally mounted with respect to the plates 126, 128 between a first position at which said peripheral surface is in locating contact with an edge 12a, 12b of the work piece 12 and a second inoperable position at which the hinged locator 136 is safely spaced from the work piece. In the first and second positions the hinged locator 136 is generally horizontal and rest on a pair of ledges 176, 178 defined in the plates 126, 128.

Industrial Applicability

In operation the apparatus 10 locates the work piece 12 on the burn table 14 at a preselected position by butting an edge of the work piece 12 against the outer peripheral surface 148 of the locator 37. Once the apparatus 10 has been installed on the burn table 14 it need not be removed prior to the burn operation and reinstalled after the burn operation to locate successive work pieces 12 of like kind, saving considerable time and expense. Prior to the burn operation the locator 37 is pivoted out of the way to prevent damage to the locator from the burn operation and simply pivoted back to locate the next work piece 12. With the outer peripheral surface 148 generated from the axis 56 allows the work piece 12 to be precisely located at any point on the surface. The arcuate length of the outer peripheral surface 148 is relatively long which allows considerable tolerance when repositioning the locator for the next work piece.

The apparatus 10 is secured in a selected hole 20 by expanding the split sleeve 80 in the hole 20. This is accomplished by pivoting the cam lever 86 by an operator, in a counterclockwise direction, as viewed in FIG. 3, moving connecting member 84 and holding member 114 axially upward compressing the split sleeve 80 between the converging surfaces 64 of the tubular shaft 34 and the conical surface 116 of the seat member 114 expanding the split sleeve 80 in the hole 20.

Other aspects, objects, and advantages of this invention can be obtained from a study of the drawings, the disclosure, and the appended claims.

We claim:

1. A work piece locating apparatus for precisely positioning a work piece relative to a work table, said work piece having a plurality of edges and said work table having a plurality of holes, comprising:

a base having first and second surfaces, an opening, a counterbore extending about said opening on said second surface, and a support member of general "U" configuration spaced preselected distances from the opening and extending outwardly from and generally transverse said first base surface;

a split sleeve having a converging internal surface and being adapted to be insertable within a selected one of said holes of the work table;

a tubular shaft having first and second end portions and a flange adjacent said first end portion, said second end portion being insertable into said sleeve and said first end portion being insertable into said base member opening with said flange piloting in said counterbore;

a holding member having a converging outer surface mateable with the converging internal surface of the split sleeve;

a clamping system having a cam associated with a connecting member and being pivotally connected to the tubular shaft for moving the holding member into and from forcible contact with the split sleeve; and a locator having a first end portion, said first end portion being pivotally connected to the base member for movement between a first preselected position at which the stop is contactable with a work piece and a second position spaced from said first position.

2. An apparatus, as set forth in claim 1, wherein the connecting member has a threaded first end portion connectable to the holding member, a middle portion extending through the sleeve and a the second base member and a second end portion pivotally connected to the holding cam.

3. An apparatus, as set forth in claim 1, wherein the second end portion of the connecting member is of a ring configuration and including a pin extending through the locking cam and the ring.

4. A work piece locating apparatus for precisely positioning a work piece relative to a work table, said work piece having a plurality of edges and said work table having a plurality of openings, comprising:

a first base having first and second surfaces, an opening, a counterbore extending about said opening on said second surface, and a supporting member of general "U" configuration spaced preselected distances from the opening and extending outwardly from and generally transverse said first base surface;

a split sleeve having internal and external surfaces and first and second end portion, said internal surface of said first and second end portion being tapered inwardly and said split sleeve being insertable into one of said table openings;

a second base member having first and second end portions and an opening extending therethrough, said second end portion having a tapered surface converging in a direction from said second surface with said first holding member converging surface being mateable with said second internal surface of said split sleeve and said second end portion extending transverse said first end portion and being insertable into the first base member counterbore;

a holding member having a threaded opening and a converging outer surface mateable with said first converging surface of said split sleeve;

a connecting member having a first threaded end portion, a second end portion pivotally connected to the first base member and a middle portion, said first end portion being threadably connected to said holding member, said middle portion being slidable extending through said second base member opening;

a locking cam pivotally connected to said first base member and said connecting member and being adapted for movement of said holding member into and from forcible engagement with the internal first end portion of the split sleeve and moving said split sleeve into forcible contact with said associated table opening; and a locator having first and second end portions, said locator second end portion having a cam and first end portion being pivotally connected to said first base portion, said locator having a preselected length and being pivotally moveable between a first position at which the cam is at a preselected location and contactable with an edge of a work piece and a second inoperable position at which the cam of the positioning stop is spaced from said first position.

* * * * *